Aug. 2, 1927.
E. L. MUELLER
1,637,833
FEEDING MECHANISM
Filed Jan. 7, 1927
2 Sheets-Sheet 1
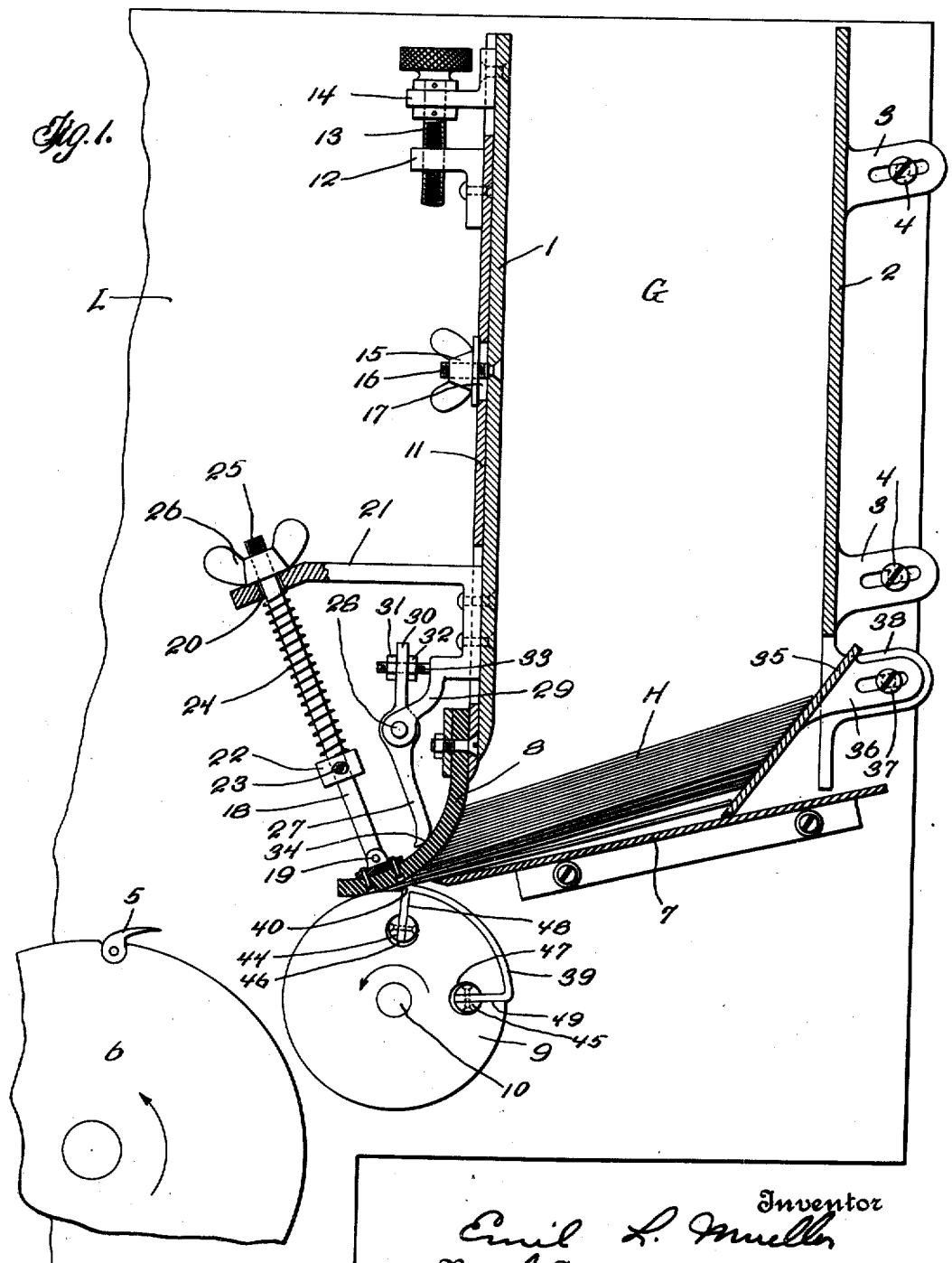

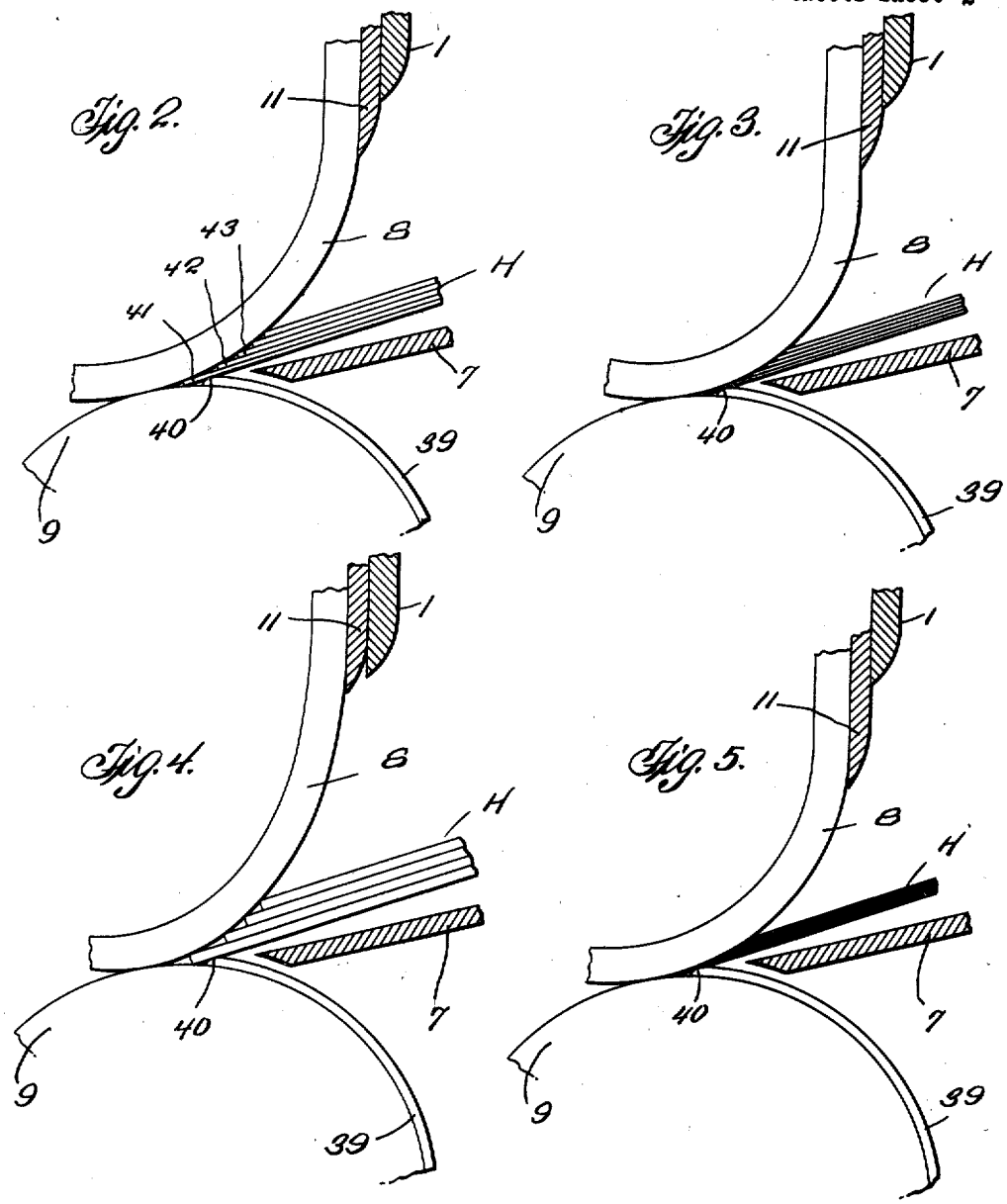

Patented Aug. 2, 1927.

1,637,833

UNITED STATES PATENT OFFICE.

EMIL L. MUELLER, OF RUTHERFORD, NEW JERSEY, ASSIGNOR TO DAVID A. McINTYRE, OF NEWARK, NEW JERSEY.

FEEDING MECHANISM.

Application filed January 7, 1927. Serial No. 159,607.

This invention relates to a feeding mechanism, that is to a mechanism by which to feed out or deliver sheets, cards, envelopes, folders, leaflets or other articles, one at a time from a hopper or chute, the mechanism being particularly, though not necessarily, applicable to a printing, collating, inserting or other similar type of machine in which it is desired to feed or deliver sheets or other articles one at a time to the related mechanism of the machine.

An object of the invention is to provide a feeding mechanism of the type referred to and including parts operable to insure the delivery of a single article at each operation of the mechanism.

A further object is to provide means whereby the mechanism is adjustable to enable it to accurately perform its functions upon articles of different thicknesses.

A further and more detailed object is to provide a hopper or chute-like structure adapted to contain the articles to be delivered and to so form said hopper or chute as to comprise parts co-operative with a delivery roller to enable the proper and accurate delivery of a single article from the chute at each operation of the delivery roller, and further to provide means whereby said parts are suitably adjustable with respect to the delivery roller to insure proper delivery of articles of different thicknesses.

A further and more specific object is to provide means whereby the delivery of articles from the hopper will be positive and with sufficient force to continue the delivery movement of a given article notwithstanding engagement of the article against a foreign obstacle, as for instance against the grippers of a carrying wheel or chain by which the article is to be carried on further through the printing or other related machine, this last object being primarily intended to insure full and complete movement of each article into proper position for being gripped by said grippers or the like at each operation of the mechanism.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a vertical sectional view through a feeding mechanism constructed in accordance with this invention.

Figs. 2, 3, 4 and 5 are diagrammatic views given for graphically illustrating different adjusted positions of the mechanism for enabling it to properly deliver sheets or cards of different thicknesses.

While the invention is adaptable for use in handling various different articles and in association with machines of various different kinds, it is herein shown and described for the purpose of illustration as handling sheets or cards and as feeding these for instance to a printing machine.

Referring to the drawings for describing in detail the structure therein illustrated, the reference character L indicates a suitable base or side plate upon which the mechanism is shown as being carried or formed.

Fixed rigidly to this base plate is a vertical wall 1, and adjustable upon said base plate is a second wall 2, the latter being connected with the base plate in any suitable manner as by means of slotted lugs 3 and retaining screws 4 so that it may be moved toward and away from the wall 1, and said two walls constituting the front and rear walls respectively of a hopper or chute G within which the sheets or cards as H are contained in preparation for their delivery one at a time to the gripper as 5 of a carrying wheel as 6 by means of which the sheets or cards are in turn moved according to requirement of the particular machine to which the present mechanism is attached. The plate L forms one side wall of the hopper of chute G and there may of course be an opposite side plate, not shown, if desired.

A bottom wall 7 of the chute is provided fixed to the plate L.

The front wall 1 of the chute terminates at its lower end somewhat above the plane of the bottom wall 7 and a separately formed wall member 8 is provided to close this gap.

The member 8 is formed of flexible material, such as rubber, soft leather, or the like, and it curves downwardly and outwardly from the vertical plane of wall 1 and has its lower forward under-surface normally resting against the upper surface of a delivery roller 9 which is rotatably mounted, as by means of shaft 10, upon the plate L, the upper surface of said delivery roller being substantially in a common plane with the upper inclined surface of the bottom wall 7 of the chute.

The wall member 8 is attached by its upper edge to the lower portion of a carrying plate 11 which is adjustable to effect vertical adjustment of the upper end of said wall member. The plate 11 is preferably mounted upon the forward face of the chute-wall 1. It carries a threaded lug 12 engaged by an adjusting screw 13 which is in turn rotatably mounted upon a bracket 14 carried by the wall 1. Rotation of the screw 13 in one direction or the other will thereby move the plate 11, and with it the upper end of the wall member 8 vertically up or down according to the direction of rotation of the screw. When properly adjusted these parts may be held against unintentional movement by means of a clamp screw 15 which is threaded upon a stud 16 projecting from the wall 1 through a slot 17 of the plate 11.

Fixed to the lower outwardly extending portion of the wall member 8 is a presser rod 18 adapted for holding the lower end portion of said wall 8 pressed toward the delivery roller 9. The rod 18 has pivotal connection by its lower end with the wall member 8 as at 19 and at its upper end extends loosely through an opening 20 provided to receive it in a bracket 21 carried preferably by the wall 1. A collar 22 is carried by the rod 18, adjustably held in position longitudinally of said rod by any appropriate means as for instance the set screw 23, and between this collar and the under-surface of the bracket 21, and preferably surrounding the rod, is a compression spring 24, whereby the lower end portion of the wall member 8 is constantly urged toward the delivery roller 9 with a pressure according to the compression force of the spring 24 as adjusted by the position of collar 22.

The upper end of the rod 18 is preferably threaded as at 25 and fitted with a thumb nut or other appropriate adjusting means as 26 through the medium of which the limit of downward movement of the rod may be accurately adjusted and determined.

A further device by which to effect adjustment of the wall member 8 consists of a presser foot 27 which engages the wall 8 intermediate its upper and lower ends. This presser foot is pivotally mounted as at 28 upon a bracket 29 also carried preferably by the wall 1, and connected with said presser foot beyond the pivot 28 is an arm 30 which extends into engagement between a pair of adjustable nuts as 31 and 32 or the like said nuts being carried upon a threaded stud 33 fixed to the bracket 29 so that adjustment of said nuts longitudinally of said stud will produce a corresponding adjustment of the lower end as 34 of the presser foot against the mid portion of the wall member 8.

It will be seen that by these various means for adjusting the upper and lower and mid portions of the wall member 8 the precise curvature of said wall member may be adjusted to a nicety with respect to the delivery roller.

A guide plate 35 is provided at the rear of the lower end of the chute for supporting the rear ends of the sheets or cards H and urging said sheets or cards always into proper contact with the surface of the wall member 8. As illustrated this guide plate is shown as provided with a lug 36 and a set screw 37 through the medium of which it may be adjustably connected with a lug 38 formed upon the rear wall 2, the purpose of said adjustment being to alter the position of said guide plate with respect to said wall member, and particularly to alter the angular relationship of these parts to best perform the function of urging the sheets or cards into intimate engagement with the wall member 8.

The delivery roller 9 may be formed of any suitable material but preferably metal, and is provided upon a segment of its exterior surface with a piece of friction material, as 39, of leather or the like, said friction material being preferably slightly raised above the normal cylindrical surface of said roller so as thereby to provide a shoulder-like portion as 40 at its forward edge, that is its edge which first engages the sheet or card to be delivered, it being here explained that the repeated engagements of this shoulder with the lowermost sheet or card produce a constant jiggling and settling effect upon the stack of sheets or cards during the rotation of the delivery roller, and thus greatly assist in causing the sheets or cards to always intimately engage against the surface of the wall member 8.

It will now be apparent that by insuring intimate contact of the lower or forward ends of the lowermost group of cards with the curved inner surface of the wall member 8 said cards respectively will move downwardly and forwardly at a rate determined by the curvature of said wall and the thickness of the respective cards, that is to say that as the lowermost card is discharged by the roller 9 the next succeeding card will drop down a distance corresponding to the thickness of the discharged card and at the same time move forwardly a distance determined by the curvature of the wall member 8 and come to rest in the position previously occupied by the discharged card. The succeeding superposed cards will do likewise, each moving downwardly and forwardly to take the place formerly occupied by its nether neighbor.

At a given curvature set of the wall member 8 cards which are relatively thick would thus move downwardly a greater distance and forwardly a lesser distance than cards which are relatively thin. And hence by altering the curvature of the wall member 8, as by means of the devices heretofore described, said wall member may be disposed to define a proper curvature for permitting and inducing just the desired amount of forward movement for cards of different thicknesses, as is graphically illustrated in the drawings Figs. 2 to 5.

In Fig. 2 the wall member 8 is shown as having a curvature suitable for properly positioning sheets or cards H of a medium thickness. Each of the cards illustrated is shown as having its forward edge resting against the curved surface of the wall 8. The forward end as 41 of the lowermost card, in following the curvature of the wall 8 within its plane, is projected a considerable distance beyond the lower end as 42 of the next succeeding superposed card. The end 42, in following the curvature of the wall 8 within its respective plane, is held by engagement with said wall against moving forwardly as far as the end of the lowermost card. It nevertheless is projected somewhat beyond the forward end as 43 of the next succeeding superposed card, etc.

It is desired that the curvature of wall 8 in the region or plane of the card ends 41 and 42 shall be such as to permit the end 41 to project beyond the end 42 just a suitable distance to properly co-operate with the shoulder-like portion 40 of the friction member 39 of the feed roller while the end 42 is held away from the immediate influence of said friction member during the time while the lowermost card is being discharged. The shoulder-like portion 40 engages the under-surface of the projecting end portion 41 of the lowermost card and, being of proper friction material to provide a suitable grip upon said surface, causes said card to be drawn forwardly between the feed roller and the wall 8, said wall meanwhile being partly compressed where it is engaged by the moving card and partly raised against the compression of spring 24. The next succeeding superposed card will be held relatively stationary while the lowermost card passes out, and will continue so until the lowermost card has been entirely removed from beneath it, whereupon it will fall toward or against the bottom wall 7, and, due to the influence of the guide plate 35, will move forwardly into the position previously occupied by the discharged card ready for being itself discharged upon the next rotation of the feed roller.

In Figs. 3, 4 and 5 the wall 8 is shown as being suitably curved to define the forward positions of cards of thicknesses differing from the thickness of cards shown in Fig. 2, it being noted particularly that for the proper handling of cards of considerable thickness the wall member 8 will be given an abrupt curvature so that the angle defined between itself and the surface of the feed roller will be quite obtuse so as thus while allowing the lowermost card to move a proper distance beyond the next superposed card for proper operation of the shoulder-like portion 40 will yet not space the latter card a greater distance backwardly of the lowermost card than is actually required for the proper operation of the shoulder-like portion 40, it being here pointed out that the extent to which the second lowermost card is held back with respect to the lowermost card should in all events be kept at a minimum consistent with effective operation of the shoulder-like portion 40 in gripping a single card. This is because it has been found troublesome to uniformly insure forward movement of a freshly dropped lowermost card for any undue distance. By properly adjusting the curvature of the wall 8 cards of various thicknesses may be disposed so that the lowermost card, and its next nearest neighbor will always occupy substantially the same relative positions with respect to the requirement for forward movement preparatory for operation of the shoulder-like portion 40.

As the cards are positively discharged one at a time by the roller 9, their forward edges come into engagement with the gripper 5 on the carrying wheel 6, or with any other device which may be provided for receiving them, and owing to the pressure of the spring 24, as well as to the pressure generated by the resiliency of wall member 8 itself, toward the roller 9 for thus holding the cards in tight frictional engagement with the friction element 39 during the discharge period, said cards will be discharged with a positive force such as will cause them to move through a positive and fixed distance and hence into positive and predetermined engagement with the gripper 5. It is intended even that the forward ends of the cards may engage the gripper 5 before the card is fully discharged and the gripper not yet sufficiently moved to accommodate unhindered discharge. In this instance the discharge of the card will continue without interruption and the card be merely buckled or bent in the space between the gripper or like obstacle and the point of engagement of the card with the discharging mechanism, the purpose being to thus more positively insure a full and complete movement of the forward edge of the card, and of every card, into proper gripping relation with the gripper 5.

The friction element 39 as above mentioned may take any desired form. Whether a piece of rubber, leather, or other friction material is employed the same may be conveniently connected with the roller 9 in the manner illustrated if desired, which consists in providing at opposite ends of said piece of material suitable enlargements as 44 and 45. The roller is shown as provided with openings as 46 and 47 for receiving the enlargements and also with slits as 48 and 49 through which adjacent portions of the piece of material may extend from the openings. By this means the friction element may be readily attached and removed whenever desired. A worn friction element may be readily removed and a fresh element inserted.

As many changes could be made in this construction without departing from the scope of the invention, as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. In a feeding mechanism, means to hold a stack of articles to be discharged, a feed roller for discharging said articles, a member arranged adjacent the feed roller having a curved surface adapted to be engaged by the articles preparatory to discharge by the feed roller, and means for altering the curvature of said curved surface.

2. In a feeding mechanism, means to hold a stack of articles to be discharged, a feed roller for discharging said articles, a flexible wall member arranged adjacent the feed roller adapted to be engaged by the articles preparatory to discharge by the feed roller, and means by which said wall member may be flexed to alter its relation to the feed roller.

3. In a feeding mechanism, means to hold a pile of sheets to be discharged, a feed roller for discharging said sheets, a member arranged adjacent the feed roller having a curved surface adapted to be engaged by said sheets preparatory to discharge by the feed roller, and means for altering the curvature of said curved surface.

4. In a feeding mechanism, means to hold a pile of sheets to be discharged, a feed roller for discharging said sheets, a member arranged adjacent the feed roller having a curved surface adapted to be engaged by said sheets preparatory to discharge by the feed roller, means to urge the sheets toward said curved surface, and means for altering the curvature of said curved surface.

5. In a feeding mechanism, means to hold a pile of sheets to be discharged, a feed roller for discharging said sheets, a flexible wall member arranged adjacent the feed roller adapted to be engaged by the edge portions of the sheets preparatory to discharge by the feed roller, and means by which said wall member may be flexed to alter its relation to the feed roller.

6. A feeding mechanism comprising a chute having front and back walls and a bottom wall to thus define a receptacle within which a pile of articles may be held preparatory to delivery, one of said walls providing a curved surface for engagement by said articles, means to urge said articles into engagement with said surface, a feed roller adjacent said curved surface, and means to alter the curvature of said curved surface.

7. A feeding mechanism comprising a chute having front and back walls and a bottom wall to thus define a receptacle within which sheets may be stacked, one of said walls comprising a flexible wall part, means to urge the cards against said flexible wall part, a feed roller adjacent said flexible wall part, and means by which to flex said flexible wall part to thereby alter its relation to said feed roller.

8. A feeding mechanism comprising a chute having front and back walls and a bottom wall to thus define a receptacle within which a pile of articles may be held preparatory to delivery, one of said walls providing a curved surface for engagement by said articles, a guide-part carried by another of said walls to urge said articles into engagement with said curved surface, a feed roller adjacent said curved surface, means to alter the curvature of said curved surface, and means by which said guide-part is adjustable.

9. A feeding mechanism comprising means providing a chute within which a pile of articles may be held preparatory to delivery, said means including a flexible wall part with which said articles engage, a feed roller arranged adjacent said flexible wall part, and means engaging said flexible wall part intermediate its margins adjustable to thereby flex said wall part.

10. A feeding mechanism comprising means providing a chute within which a pile of articles may be held preparatory to delivery, said means including a flexible wall part with which said articles engage, a feed roller arranged adjacent said flexible wall part, a carrier for said flexible wall part, and means whereby said carrier is adjustable to thereby flex said wall part.

11. A feeding mechanism comprising means providing a chute within which a pile of articles may be held preparatory to delivery, said means including a flexible wall part with which said articles engage, a feed roller arranged adjacent said flexible wall part, a carrier for said flexible wall part, means whereby said carrier is adjustable for thereby adjusting said flexible wall part with respect to the feed roller, a member engaging said wall part spaced from said carrier including spring means to urge the wall part toward the feed roller, and means by which to adjust said member for thereby further determining the relationship of the flexible wall part to the feed roller.

12. A feeding mechanism comprising means providing a chute within which a pile of articles may be held preparatory to delivery, said means including a flexible wall part with which said articles engage, a feed roller arranged adjacent said flexible wall part, means engaging said wall part at one edge thereof to support said wall part, means engaging the opposite edge portion of the wall part to urge said opposite edge portion toward the feed roller, and means engaging an intermediate portion of said wall part adjustable to flex said wall part.

In testimony whereof I affix my signature.

EMIL L. MUELLER.

11. A feeding mechanism comprising means providing a chute within which a pile of articles may be held preparatory to delivery, said means including a flexible wall part with which said articles engage, a feed roller arranged adjacent said flexible wall part, a carrier for said flexible wall part, means whereby said carrier is adjustable for thereby adjusting said flexible wall part with respect to the feed roller, a member engaging said wall part spaced from said carrier including spring means to urge the wall part toward the feed roller, and means by which to adjust said member for thereby further determining the relationship of the flexible wall part to the feed roller.

12. A feeding mechanism comprising means providing a chute within which a pile of articles may be held preparatory to delivery, said means including a flexible wall part with which said articles engage, a feed roller arranged adjacent said flexible wall part, means engaging said wall part at one edge thereof to support said wall part, means engaging the opposite edge portion of the wall part to urge said opposite edge portion toward the feed roller, and means engaging an intermediate portion of said wall part adjustable to flex said wall part.

In testimony whereof I affix my signature.

EMIL L. MUELLER.

CERTIFICATE OF CORRECTION.

Patent No. 1,637,833.   Granted August 2, 1927, to

EMIL L. MUELLER.

It is hereby certified that the above numbered patent was erroneously issued to "David A. McIntyre, of Newark, New Jersey" as assignee of the entire interest in said invention, whereas said patent should have been issued to the inventor, said "Mueller and David A. McIntyre", said McIntyre being assignee of one-half interest only in said invention, as shown by the records of assignments in this office; and that the said Letters Patent should be read with this correction therein that the same may conform to the record of the case in the Patent Office.

Signed and sealed this 18th day of October, A. D. 1927.

M. J. Moore,
Acting Commissioner of Patents.

Seal.

CERTIFICATE OF CORRECTION.

Patent No. 1,637,833.   Granted August 2, 1927, to

EMIL L. MUELLER.

It is hereby certified that the above numbered patent was erroneously issued to "David A. McIntyre, of Newark, New Jersey" as assignee of the entire interest in said invention, whereas said patent should have been issued to the inventor, said "Mueller and David A. McIntyre", said McIntyre being assignee of one-half interest only in said invention, as shown by the records of assignments in this office; and that the said Letters Patent should be read with this correction therein that the same may conform to the record of the case in the Patent Office.

Signed and sealed this 18th day of October, A. D. 1927.

Seal.

M. J. Moore,
Acting Commissioner of Patents.